(12) United States Patent
Clemens

(10) Patent No.: US 7,104,063 B2
(45) Date of Patent: Sep. 12, 2006

(54) DEVICE FOR PRODUCING MECHANICAL ENERGY

(75) Inventor: Herbert Clemens, Berlin (DE)

(73) Assignee: AMOVIS GmbH, Berlin (DE)

( * ) Notice: Subject to any disclaimer, the term of this patent is extended or adjusted under 35 U.S.C. 154(b) by 16 days.

(21) Appl. No.: 10/493,105
(22) PCT Filed: Oct. 18, 2002
(86) PCT No.: PCT/EP02/11705
§ 371 (c)(1), (2), (4) Date: Apr. 20, 2004
(87) PCT Pub. No.: WO03/036072
PCT Pub. Date: May 1, 2003

(65) Prior Publication Data
US 2004/0255584 A1  Dec. 23, 2004

(30) Foreign Application Priority Data
Oct. 20, 2001  (DE) .......................... 201 17 271 U

(51) Int. Cl.
F01K 23/06 (2006.01)
F01K 23/10 (2006.01)
F02G 5/00 (2006.01)
F02G 5/02 (2006.01)
F22B 1/18 (2006.01)

(52) U.S. Cl. ............................. 60/618; 60/617; 60/698; 60/712

(58) Field of Classification Search .................. 60/616, 60/617, 618, 698, 712
See application file for complete search history.

(56) References Cited

U.S. PATENT DOCUMENTS 2,620,621 A * 12/1952 Nettel .......................... 60/616

(Continued)

FOREIGN PATENT DOCUMENTS

DE  2116824  10/1972
DE  3025052  1/1982

(Continued)

OTHER PUBLICATIONS

Buschmann et al.; *Zero Emission Engine—The Steam Engine with Isothermal Expansion* MTZ (Motortechnische Zeitschrift; 61 (2000); vol. 5; F. Vieweg & Sohn Verlagsgesellschaft mbH; Wiesbaden.

*Primary Examiner*—Sheldon J Richter

(57) ABSTRACT

The invention relates to a device for producing mechanical energy. Said device contains an internal combustion engine and an expansion engine (20, 21) which is fed with superheated steam from a steam generator. Exhaust gases of the internal combustion engine are injected into the steam generator (24) to use the waste heat thereof. In order to eliminate pollutants and non-burned fuel in the exhaust gases of the internal combustion engine in a simple and effective manner, the steam generator (24) is heated by a non-catalytic burner (16) at a burner temperature of between 1100° and 1300° C. The exhaust gases of the internal combustion engine can be combined with the combustion gases in the burner (16). The after-burning of non-burned fuel and the combustion of pollutants is thus carried out in a burner (16) in a non-catalytic manner. The combustion gases in said burner (16) are at a temperature such that non-burned fuel components in the exhaust gases of the internal combustion engine which are introduced into the burner are after-burned, but form, however, essentially no nitrogen oxides at excessive temperatures. The burner (16) is used to heat the steam generator (24) and can be designed according to the energy requirement of the steam generator (24) and the expansion engine (20, 21). The heat of the exhaust gases of the internal combustion engine is used to generate steam.

11 Claims, 2 Drawing Sheets

U.S. PATENT DOCUMENTS

| | | | | |
|---|---|---|---|---|
| 4,300,353 A | | 11/1981 | Ridgway | 60/618 |
| 4,599,868 A | * | 7/1986 | Lutjens et al. | 60/618 |
| 4,901,531 A | * | 2/1990 | Kubo et al. | 60/618 |
| 4,920,750 A | * | 5/1990 | Iishiki et al. | 60/618 |
| 5,121,607 A | * | 6/1992 | George, Jr. | 60/618 |
| 5,339,632 A | * | 8/1994 | McCrabb et al. | 60/618 |
| 5,896,746 A | * | 4/1999 | Platell | 60/712 |

FOREIGN PATENT DOCUMENTS

| | | |
|---|---|---|
| DE | 19610382 | 9/1997 |
| DE | 19921420 | 11/2000 |
| GB | 804322 | 11/1958 |
| WO | WO 03/036072 | 5/2003 |

* cited by examiner

DEVICE FOR PRODUCING MECHANICAL ENERGY

This application claims the benefit of German Application No. 201 17 271.2 filed Oct. 20, 2001 and PCT/EPO2/11705 filed Oct. 18, 2002.

BACKGROUND OF THE INVENTION

1. Technical Field

The invention relates to a device for the generation of mechanical energy comprising an internal combustion engine and an expansion engine which is fed with superheated steam from a steam generator, wherein the exhaust gases of the internal combustion engine are injected into the steam generator to use the waste heat thereof.

2. Prior Art

The DE 196 10 382 C2 describes a combined engine consisting of a combustion engine and an expansion engine in the form of a steam engine. The steam engine receives the high pressure steam from a steam generator. The high pressure steam is preheated by the cooler of the engine block of the combustion engine. The steam generator is exposed to the exhaust gases of the combustion engine, the combustion engine and the steam engine operate on a common crank shaft. In order to filter pollutants from the exhaust gases an oxidizing catalytic converter is arranged upstream of the steam generator in the exhaust pipe which is guided through the steam generator to the atmosphere. The DE 196 10 382 C2 suggests to insert fuel from time to time or continuously into the exhaust pipe upstream of the catalytic converter to increase the portion of the power of the steam engine. This additional fuel is burnt in the catalytic converter together with unburnt fuel from the combustion engine.

This is an after-burning of unburnt fuel from the combustion engine by an oxidizing catalytic converter in the usual way. The steam generator primarily uses the waste heat of the exhaust gases including the combustion heat generated in the oxidizing catalytic converter. Additionally fuel can be injected into the oxidizing catalytic converter only to increase the power of the steam generator still more.

The amount of fuel which can be additionally burnt in the oxidizing catalytic converter is limited by the constructive properties of the oxidizing catalytic converter. The oxidizing catalytic converter is designed to after-burn the remnants of unburnt fuel in the exhaust gases or certain pollutants, but not to serve as the heat source for a steam generator. The steam engine operating on the same crank shaft as the combustion engine essentially is to make use of the heat of the exhaust gases and thereby increase the efficiency.

SUMMARY OF THE INVENTION

Disclosue of the Invention

It is an object of the invention to increase the power of the steam generator with a device of the above mentioned kind.

It is a further object of the invention to eliminate pollutants and unburnt fuel form the exhaust gases of the combustion engine in a simple and effective way.

According to the invention this object is achieved in that the steam generator is heated by a non-catalytic burner to a burner temperature between 1100° to 1300° C. and the exhaust gases from the combustion engine are injected into the combustion gases of the burner.

The after-burning of unburnt fuel and the combustion of pollutants is therefore effected in a non-catalytical manner in a burner. The burning gases in this burner have such a temperature that, on one hand, unburnt fuel components in the exhaust gases of the combustion engine supplied thereto are after-burnt and, on the other hand, essentially do not form any nitrogen oxides due to high temperatures. The burner serves for heating of the steam generator and can be designed in accordance with the power requirements of the steam generator and the expansion engine. The heat of the exhaust gases of the combustion engine is used for the steam generation.

The non-catalytical burner can be a porous burner. Preferably the non-catalytical burner and the combustion engine are operated with the same kind of fuel.

Preferably the burner is arranged downstream to a mixing chamber, into which the hot exhaust gases of the combustion engine are injected. Fuel is injected into the hot exhaust gases for the generation of a burning gas for the burner. The hot exhaust gases are used to evaporate the fuel and to generate a burning gas in the mixing chamber.

Preferably the burner is provided with air supplying means. The air supplying means can introduce combustion air into an exhaust pipe upstream from its opening into the mixing chamber. The air supplying means can be provided with a fan. Upstream from the junction of the air supplying pipe and the exhaust pipe a sensor can be arranged for the determination of the oxygen content in the exhaust gas. The fan can then be controlled depending on the oxygen content.

Downstream from the burner a catalytic converter for pollutants or a carbon-particulate filter or both can be provided. The catalytic converter for pollutants and the carbon-particulate filter are arranged upstream from the steam generator.

The remains of pollutants which are not yet burnt by the burner or which have formed in the burner, for example in the form of nitrogen oxides, are burnt in such a downstream catalytic converter for pollutants. The catalytic converter for pollutants only needs to be designed for burning the remainder of pollutants. The catalytic converter for pollutants is quickly heated up by the hot exhaust gases from the burner which have not been cooled down by the steam generator. Also the for example ceramic carbon-particulate filter is heated such that the carbon particles are burnt therein.

An embodiment of the invention is described in greater detail hereinbelow with reference to the accompanying drawings.

DETAILED DESCRIPTION OF THE PREFERRED EMBODIMENTS

Figure 1:
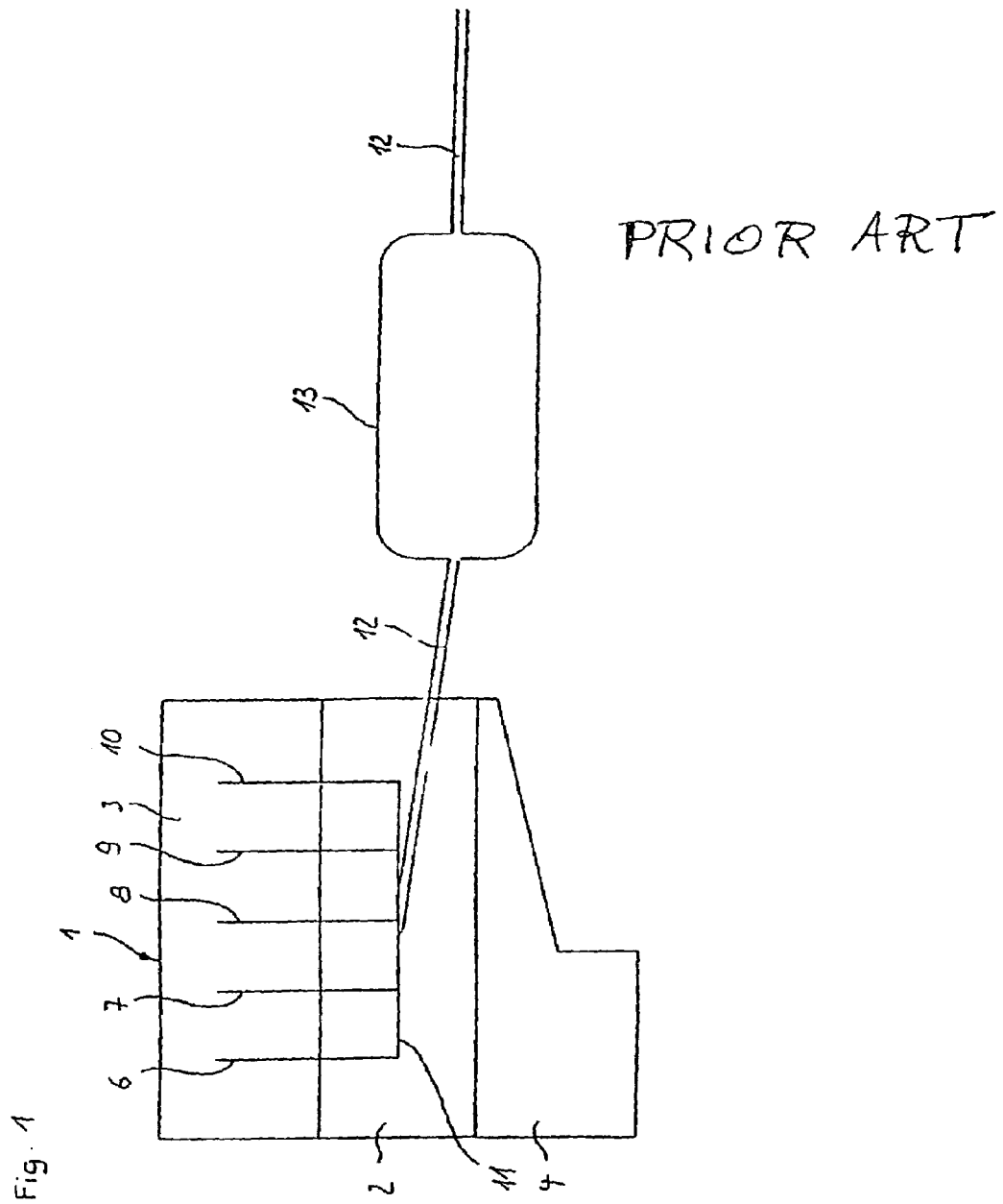
FIG. 1 is a schematical side view of a combustion engine with exhaust pipe and an integrated steam engine as an expansion engine.

As a combustion engine, FIG. 1 shows a typical piston engine 1 with a engine block 2, a cylinder head 3 and an oil pan 4 therebelow. The piston engine 1 is provided with five cylinders, the outlet of each of the cylinders opening into an exhaust manifold 6 to 10. The exhaust manifolds 6 to 10 end in a collector 11 joining to a main exhaust pipe 12. The main exhaust pipe 12 is provided with an extension 13 wherein an expansion engine is incorporated in the form of a steam engine of the kind shown in FIG. 2 in greater detail.

Figure 2:
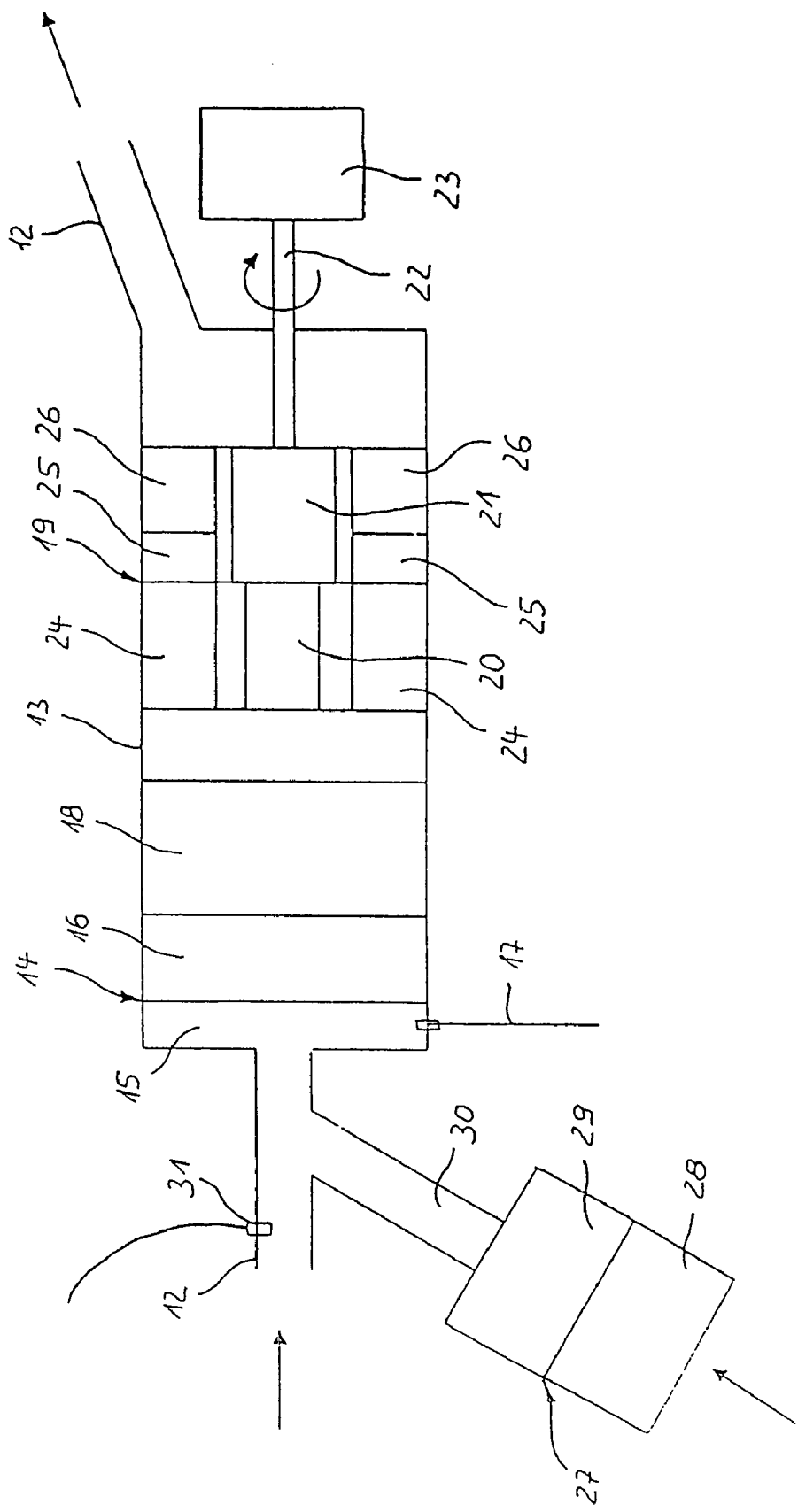
FIG. 2 is a more detailed, but schematic representation of the steam engine of FIG. 1.

As can be seen from FIG. 2 the main exhaust pipe 12 opens into a burner device 14. The burner device 14 is arranged coaxial to the main exhaust pipe 12. The burner device 14 is provided with a mixing chamber 15, on the entrance side, and with a burner 16 in the form of a porous burner downstream thereof. As is well known, a porous burner is provided with a burner body made of porous ceramic material. A fuel gas-air-mix is burnt in the porous burner body without open flame, the flame front extending within the porous burner body. Exhaust gases leave the burner body as combustion products. However, the described device can operate with different suitable burners.

Fuel is injected into the mixing chamber 15 by fuel injecting means 17. This fuel is of the same kind as that fed to the piston engine 1. The injected fuel is mixed with the hot exhaust gases of the piston engine and is, thereby, evaporated. The mixture is burnt in the burner 16 with a very homogenous temperature distribution at between 1200 and 1300° C.

A catalytic converter for pollutants 18, which may be a simple oxidizing catalytic converter is directly and axially arranged downstream of the burner device 14. Due to the direct connection the catalytic converter for pollutants 18 is heated up extremely fast after the starting so that only little starting emissions are generated. If the piston engine 1 is a diesel engine a carbon-particulate filter, for example on the basis of ceramics, replaces the catalytic converter for pollutants 18. Due to the directly connected burner device 14 arranged upstream the carbon-particulate filter can be heated very much, such that the carbon particles are burnt and the carbon-particulate filter is cleaned out.

A steam engine 19 also is arranged adjacent and coaxial and is provided with a first expansion stage 20 and a second expansion stage 21. They are connected to a coaxial drive shaft 22 outside of the exhaust pipe which drives a generator 23 for the generation of electric power either for directly supplying electric consumers or for a car battery. Instead, auxiliary power units such as the compressor of an air conditioning system can be driven directly.

The second expansion stage 21 is surrounded by a first steam generator 24 which is provided with an annular heat exchanger not shown in detail, through which the heating gas generated by the burner device 14 flows. In the first steam generator 24 flows feed water coming from a feed water pre-heater not shown in detail. It flows to a second steam generator 25 surrounding the first expansion stage 20 and also being exposed to the heating gas generated in the burner device 14. The steam generated in this way is expanded in the first expansion stage 20 to a median pressure. After the first expansion, the steam is heated to higher temperature again in the re-heater 26 and expanded to a low pressure in the subsequent second expansion stage 21. Afterwards the steam is lead to a condenser in a closed system not shown in detail. In the condenser the steam is completely condensed to feed water. The feed water is then returned to a reservoir. The technically useable power is realised in the two expansion stages 20, 21. Due to the re-heating, high efficiency is achieved.

Such closed systems are known (DE-Z "MTZ Motortechnische Zeitschrift", 61 (2000) 314–323) and are therefore not described here in detail. Also the re-heater 26 is exposed to the axial flow of heating gas. The re-heater jacket-like surrounds the two expansion stages 20, 21. Thereafter the heating gas re-enters the main exhaust pipe 12 which continues with a decreased diameter.

If the piston engine 1 is a diesel engine, the excess air in the exhaust gas is sufficient to maintain the combustion in the burner device 14. In Otto engines the amount of this excess air is—if there is any at all—too small. In this case an air supply device 27 is provided consisting of an air filter 28 on its entrance-side and an electrically driven fan 29. The air supply device 27 is connected to the main exhaust pipe 12 by an air supply pipe 30 joining the main exhaust pipe. Thereby exhaust gas with an increased amount of air flows into the mixing chamber 15. In order to achieve a complete combustion a sensor responsive to oxygen, for example a lambda probe, is provided in front of the junction of the air supply pipe and the main exhaust gas pipe 30, the probe measuring the oxygen contents in the exhaust gas. The air supply is controlled by the fan depending on this oxygen contents.

The invention claimed is:

1. A device for generating mechanical energy comprising an internal combustion engine providing hot exhaust gases, and an expansion steam engine adapted to be operated independently of said internal combustion engine, a steam generator and means for feeding steam from said steam generator to said expansion steam engine, non-catalytic burner means operating at temperatures between 1100° C. and 1300° C. for heating said steam generator, means for supplying fuel to said non-catalytic burner means, and means for injecting said exhaust gases from said internal combustion engine into said fuel supplied to said burner means.

2. A device as claimed in claim 1, wherein said non-catalytic burner means comprise a porous burner.

3. A device as claimed in claim 1, wherein said non-catalytic burner means and said combustion engine are operated with the same kind of fuel.

4. A device as claimed in claim 1, wherein a catalytic converter for pollutants is provided downstream of said non-catalytic burner means.

5. A device as claimed in claim 4, wherein said catalytic converter for pollutants is provided upstream of said steam generator.

6. A device as claimed in claim 1, wherein a carbon-particulate filter is provided downstream of said non-catalytic burner means.

7. A device as claimed in claim 6, wherein a carbon-particulate filter is provided upstream of said steam generator.

8. A device as claimed in claim 1, wherein said non-catalytic burner means comprise a non-catalytic burner and mixing chamber means arranged upstream of said non-catalytic burner, means for feeding said hot exhaust gases from said internal combustion engine through exhaust pipe means opening into said mixing chamber means and means for injecting liquid fuel into said hot exhaust gases, whereby said liquid fuel is evaporated and, together with said hot exhaust gases provides combustion gas for said non-catalytic burner means.

9. A device as claimed in claim 8, and further comprising means for supplying air to said non-catalytic burner means.

10. A device as claimed in claim 9, wherein said air supplying means comprise an air supply pipe, said air supply pipe into said exhaust pipe means upstream of said opening of said exhaust pipe means into said mixing chamber means.

11. A device as claimed in claim 10, wherein said air supplying means comprise fan means for feeding air into said air supply pipe and sensor means for determining the oxygen contents in said exhaust gases, and means responsive to said sensor means for controlling said fan means.

* * * * *